Patented Sept. 8, 1936

2,053,394

UNITED STATES PATENT OFFICE 2,053,394

AZO DYESTUFFS AND THEIR PRODUCTION

Detlef Delfs, Leverkusen-I. G.-Werk, Germany, assignor to General Aniline Works, Inc., New York, N. Y., a corporation of Delaware No Drawing. Application March 11, 1935, Serial No. 10,522. In Germany March 17, 1934

9 Claims. (Cl. 260—91)

The present invention relates to a process of preparing azodyestuffs and the new products obtainable by the said process, more particularly it relates to a process of preparing azodyestuffs containing at least once the grouping

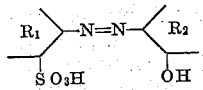

wherein $R_1$ and $R_2$ stand for azodyestuff components, for example, $R_1$ and $R_2$ may stand for radicals of the benzene or naphthalene series, for instance, for a benzene or naphthalene nucleus which may be further substituted by substituents, such as the sulfonic acid groups; the carboxylic acid group; halogen; alkyl, such as methyl or ethyl; hydroxy; alkoxy, such as methoxy or ethoxy; aryl, such as phenyl; aralkyl, such as a radical of the benzyl series; the nitro group and the like.

In accordance with the present invention azodyestuffs of the above-identified general formula are prepared by starting with an azodyestuff containing at least once the grouping

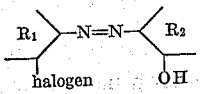

wherein $R_1$ and $R_2$ stand for radicals of the benzene or naphthalene series, and reacting upon the same with a watersoluble sulfite in the presence of an agent yielding copper in an aqueous neutral to alkaline medium at elevated temperature.

As agents yielding copper there may be used finely divided copper or copper compounds generally used in the art of preparing copper complex compounds of azodyestuffs, for instance, copper oxide or hydroxide, copper salts, such as cupric sulfate and cupric chloride, further, the complex compounds of copper with tertiary organic bases, for example, the complex compound of cupric sulfate with pyridine, or finally the copper complex compounds of organic hydroxy compounds, for instance, of glycerine or tartaric acid.

The quantity of the copper compound used for performing my new process may be varied within wide limits. The reaction probably proceeds in such a manner that in a first step the starting dyestuff yields a copper complex compound in which the halogen atom can easily be substituted by other substituents, in the present case, by a sulfonic acid group. As the copper complex compound of the o-sulfo-o'-hydroxy-azodyestuff is rather unstable, the copper tends to split off, and for this reason, it is not necessary to use equimolecular quantities of the starting dyestuff and of the copper compound, because the copper split off from the o-sulfo-o'-hydroxyazodyestuff complex compound can enter into reaction with unchanged starting dyestuff eventually present.

As outlined above the reaction is performed in a neutral or alkaline aqueous medium; however, it shall be mentioned that a caustic alkaline reaction advantageously is avoided in view of the tendency of the halogen to be substituted by the hydroxy group in a caustic alkaline medium.

The process may be performed at temperatures between about 70 and about 100° C., however, I wish it to be understood that the same can also be performed at temperatures beyond the limits given without departing from the spirit of my invention, for example, the reaction may be carried out at higher temperatures and with the application of pressure.

By the presence of nitrogen containing tertiary bases, such as pyridine, the reaction is accelerated in many cases, and the addition of such bases is of especial value when waterinsoluble azodyestuffs are used as starting components, in this case the base simultaneously acting as solvent.

When separating the reaction products from an alkaline medium they may contain copper in a complex form which copper may be removed by treating with an acid.

The invention is illustrated by the following examples, without being limited thereto:

*Example 1.*—50 grams of the azodyestuff from diazotized 3-amino-4-chlor-1-methylbenzene and 2-hydroxynapthalene-5, 7-disulfonic acid are dissolved in 1000 ccs. of hot water. To the solution there are added 5 grams of crystallized copper sulfate, and after the same have dissolved 15 grams of calcined sodium carbonate. The solution is then heated to 90° C., and at this temperature 20 grams of sodium sulfite free from water are added. After stirring for 3 hours, the new dyestuff is isolated in the usual manner; it is soluble in water with an orange coloration. In the free state it corresponds to the following formula:

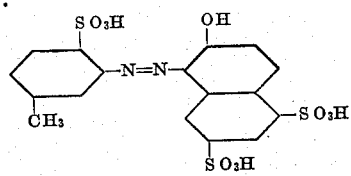

When substituting the 3-amino-4-chloro-1- methylbenzene by the 2-amino-3-chloro-1-methylbenzene or by o-chloroaniline and the 2-hydroxynaphthalene-5,7-disulfonic acid by 2-naphthol-6-sulfonic acid, 2-naphthol-3,6-disulfonic acid or 2-amino-8-naphthol-6-sulfonic acid or an N-acyl derivative thereof, the process proceeds in the same manner.

*Example 2.*—62 grams of the azodyestuff from diazotized 2,4-dichloroaniline-6-sulfonic acid and β-naphthol are dissolved in 500 ccs. of water at 95–100° C. Thereto are added 2 grams of copper sulfate and after the same have dissolved 5 grams of calcined sodium carbonate; when the latter have dissolved, 20 grams of sodium sulfite free from water are introduced. After stirring for one hour at 95–100° C., the new dyestuff having in the free state the following formula:

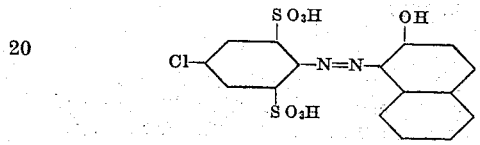

is isolated in the usual manner. It dyes wool golden-yellow shades.

When substituting the 2,4-dichloroaniline-6-sulfonic acid by 2-chloroaniline-5-sulfonic acid or 2,5-dichloroaniline-4-sulfonic acid and the β-naphthol by acylamino-naphthols, the process can be performed in the same manner.

*Example 3.*—53.7 grams of the dyestuff from diazotized 1-chloro-2-naphthylamine-6-sulfonic acid and 2-hydroxynaphthalene-7-sulfonic acid are dissolved in water, and thereto is added at 85° C. a solution of 20 grams of crystallized copper sulfate in 100 ccs. of water. After the addition of 20 grams of calcined soda and 20 grams of sodium sulfite free from water, the mixture is stirred for one hour at 85–90° C. The dyestuff having in the free state the following formula:

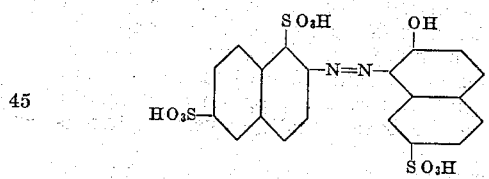

dyes wool red shades.

I claim:

1. The process which comprises reacting upon an azo-dyestuff containing at least once the grouping

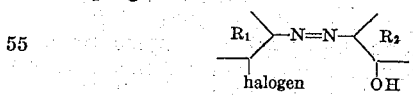

wherein $R_1$ and $R_2$ stand for radicals of the benzene or naphthalene series, with a watersoluble sulfite in the presence of an agent yielding copper in an aqueous neutral to alkaline medium at a temperature between about 70° C. and about 100° C.

2. Process as claimed in claim 1, in which the process is carried out with the addition of a nitrogen containing tertiary base.

3. Process as claimed in claim 1, in which the process is carried out in an aqueous neutral to soda-alkaline medium.

4. Process as claimed in claim 1, in which the process is carried out in an aqueous neutral to soda-alkaline medium at a temperature between about 70° C. and about 100° C.

5. The process which comprises reacting upon an azodyestuff of the general formula:

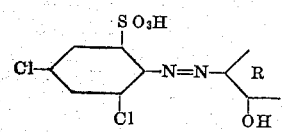

wherein R stands for a radical of the naphthalene series, with a watersoluble sulfite in the presence of an agent yielding copper in an aqueous neutral to alkaline medium at a temperature between about 70° C. and about 100° C.

6. Process as claimed in claim 1, in which the process is carried out with copper sulfate in soda-alkaline medium at a temperature between about 95° C. to about 100° C.

7. The process which comprises reacting upon an azodyestuff of the formula:

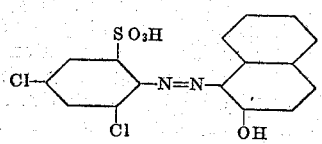

with sodium sulfite in the presence of copper sulfate and in an aqueous soda-alkaline medium at 95–100° C.

8. As new products azodyestuffs of the general formula:

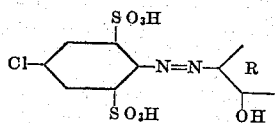

wherein R stands for a naphthalene radical, dyeing wool generally yellow to red shades of good fastness properties.

9. The dyestuff of the following formula:

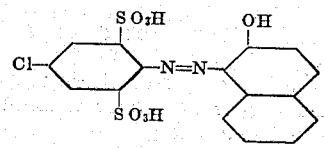

dyeing wool golden-yellow shades of good fastness properties.

DETLEF DELFS.